(12) United States Patent
Christensen

(10) Patent No.: US 6,945,387 B1
(45) Date of Patent: Sep. 20, 2005

(54) BOTTOM SURFACE DRIVE FOR AN ENDLESS BELT IN A CONVEYOR SYSTEM

(76) Inventor: Franz G. Christensen, 2655 6th Ave. S., St. Petersburg, FL (US) 33712-1642

( * ) Notice: Subject to any disclaimer, the term of this patent is extended or adjusted under 35 U.S.C. 154(b) by 10 days.

(21) Appl. No.: 10/838,124

(22) Filed: May 3, 2004

(51) Int. Cl.$^7$ .............................................. B65G 23/04
(52) U.S. Cl. ....................... 198/835; 198/834; 198/849
(58) Field of Search ................ 198/849, 833, 198/834, 835; 474/204, 205, 249, 153

(56) References Cited

U.S. PATENT DOCUMENTS

| | | | |
|---|---|---|---|
| 295,906 A * | 4/1884 | Clapp | ......................... 474/153 |
| 508,153 A | 11/1893 | Storie | |
| 531,860 A * | 1/1895 | Rhodes | ....................... 198/849 |
| 618,083 A | 1/1899 | Gentry | |
| 1,186,785 A | 6/1916 | Holt | |
| 1,843,208 A * | 2/1932 | Cutler | ......................... 198/834 |
| 2,912,098 A | 11/1959 | Manes et al. | |
| 3,048,917 A | 8/1962 | Slaughter | |
| 4,283,184 A | 8/1981 | Berg | |
| 4,589,543 A * | 5/1986 | Hastem-Muller | ........... 198/834 |
| 5,013,286 A | 5/1991 | Breher | |
| 5,131,728 A | 7/1992 | Katoh et al. | |
| 5,482,364 A | 1/1996 | Edwards et al. | |
| 5,609,238 A | 3/1997 | Christensen | |
| 6,109,427 A * | 8/2000 | Hosch et al. | ............... 198/835 |
| 6,120,405 A | 9/2000 | Oertley et al. | |

* cited by examiner

Primary Examiner—James R. Bidwell
(74) Attorney, Agent, or Firm—Larson & Larson, PA; Herbert W. Larson

(57) ABSTRACT

A top surface and a bottom surface of an endless belt. The bottom surface having a longitudinal row of spaced apart pairs of pocket attached. Openings in each pocket of a pair opposed to each other, the pocket pairs mounted equidistant between the belt sides. A clip having a pair of spaced apart pliable feet mounted respectively in each pair of pockets. A link of a link chain is held in place by a pair of spaced apart downwardly directed arms integral with the clip. The link chain is engaged to a sprocket drive in a conveyor system to move the endless belt.

25 Claims, 7 Drawing Sheets

BOTTOM SURFACE DRIVE FOR AN ENDLESS BELT IN A CONVEYOR SYSTEM

BACKGROUND OF THE INVENTION

This invention relates to conveyor belts. More particularly, it relates to an endless belt conveyor driven by a driving mechanism mounted on the underside of the belt.

Most prior art conveyor belts are power-driven by side mounted chains. In the case of multi-sectional belt conveyors as shown in U.S. Pat. No. 5,609,238, a belt roller on a transverse roller shaft engages a continuous conveyor belt and is driven by a motor. Such a multi-sectional belt has received wide spread commercial acceptance in industries requiring portable low cost, lightweight conveyors. The search continues for less complicated and less costly belt conveyors that will enhance the pulling power of the conveyor.

SUMMARY OF THE INVENTION

The present invention provides an improved low cost endless belt conveyor system that provides additional choices to businesses requiring conveyors capable of carrying varying weight loads at enhanced pulling power over conventional conveyors.

The improved endless belt conveyor system utilizes an endless belt with a drive engaging component attached to a bottom surface of the belt. Retaining clips are mounted within a plurality of pockets permanently attached in a row to a bottom surface of the endless belt. Feet on the retaining clip fit into the pockets and downwardly depending arms engage a link on a link chain. The link chain is mounted at about the mid-section of the conveyor belt lower surface and is electrically or hydraulically driven by sprockets mounted in a groove on the conveyor housing top surface.

BRIEF DESCRIPTION OF THE DRAWINGS

The invention can be best understood by those having ordinary skill in the conveyor belt art by reference to the following detailed description when considered in conjunction with the accompanying drawings in which.

DETAILED DESCRIPTION OF THE BEST MODE

Figure 1:
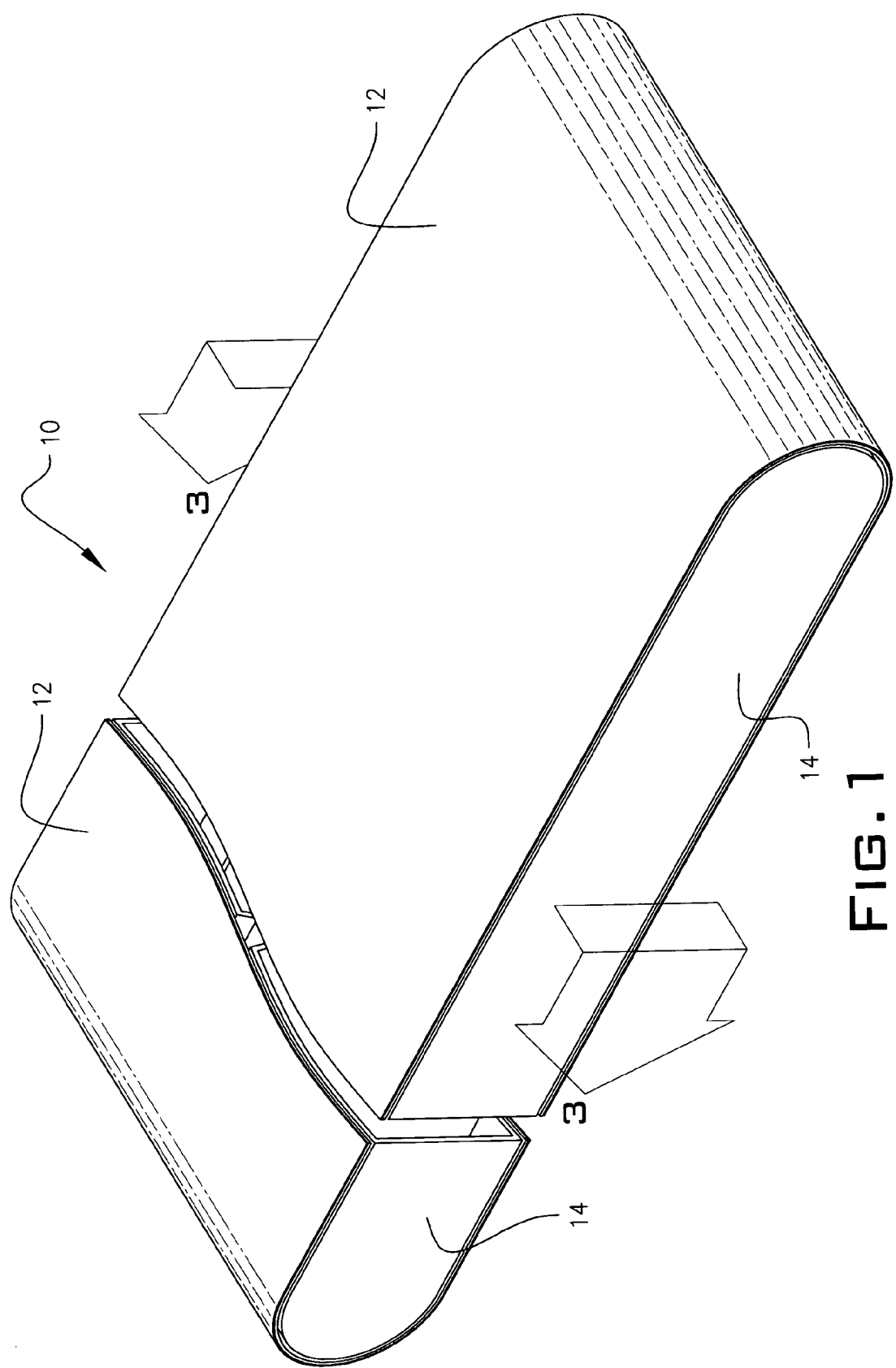
FIG. 1 is a perspective broken apart view of an endless conveyor belt system.

Throughout the following detailed description, the same reference numerals refer to the same elements in all figures.

Figure 2:
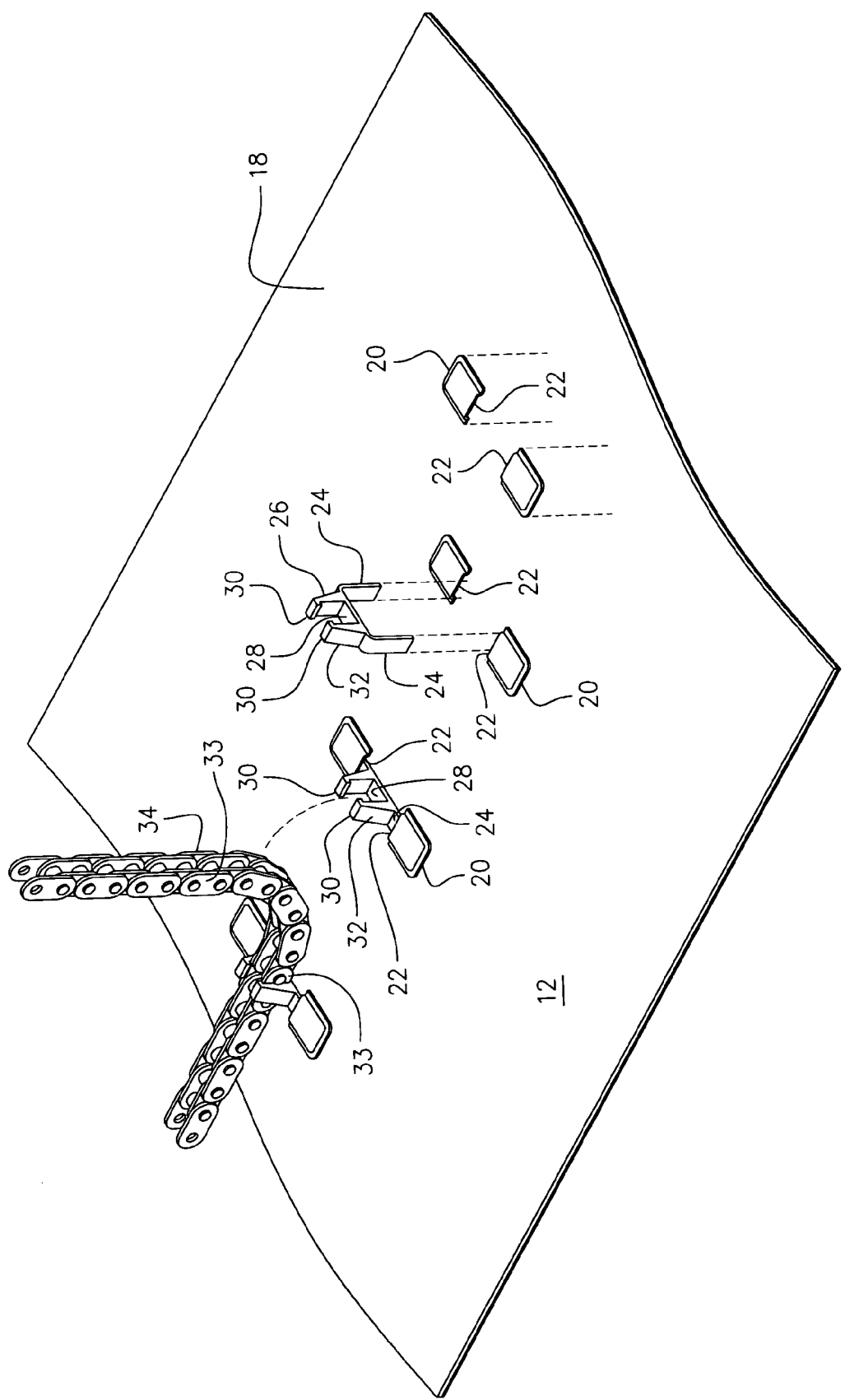
FIG. 2 is an underside view of the endless belt of this invention used in the conveyor system showing the connection of a retaining clip to a link of an endless link chain.
Figure 3:
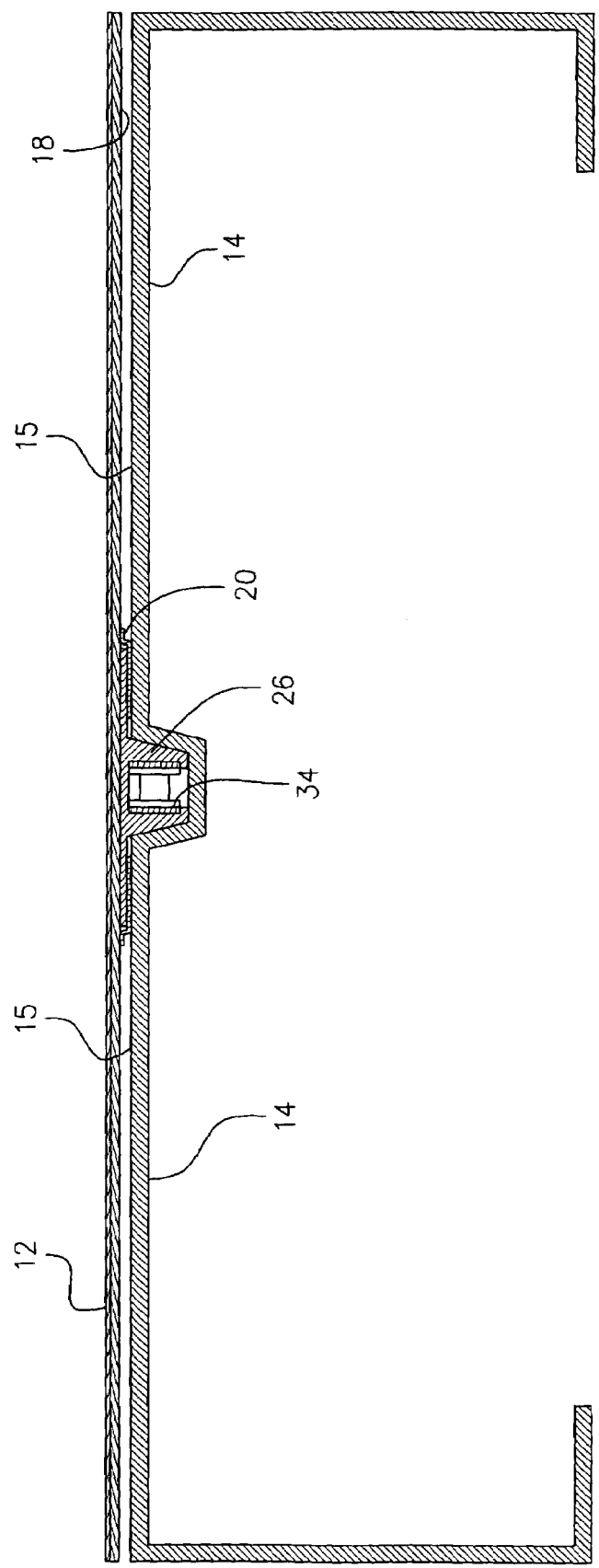
FIG. 3 is a sectional view along line 3—3 of FIG. 1.
Figure 4:
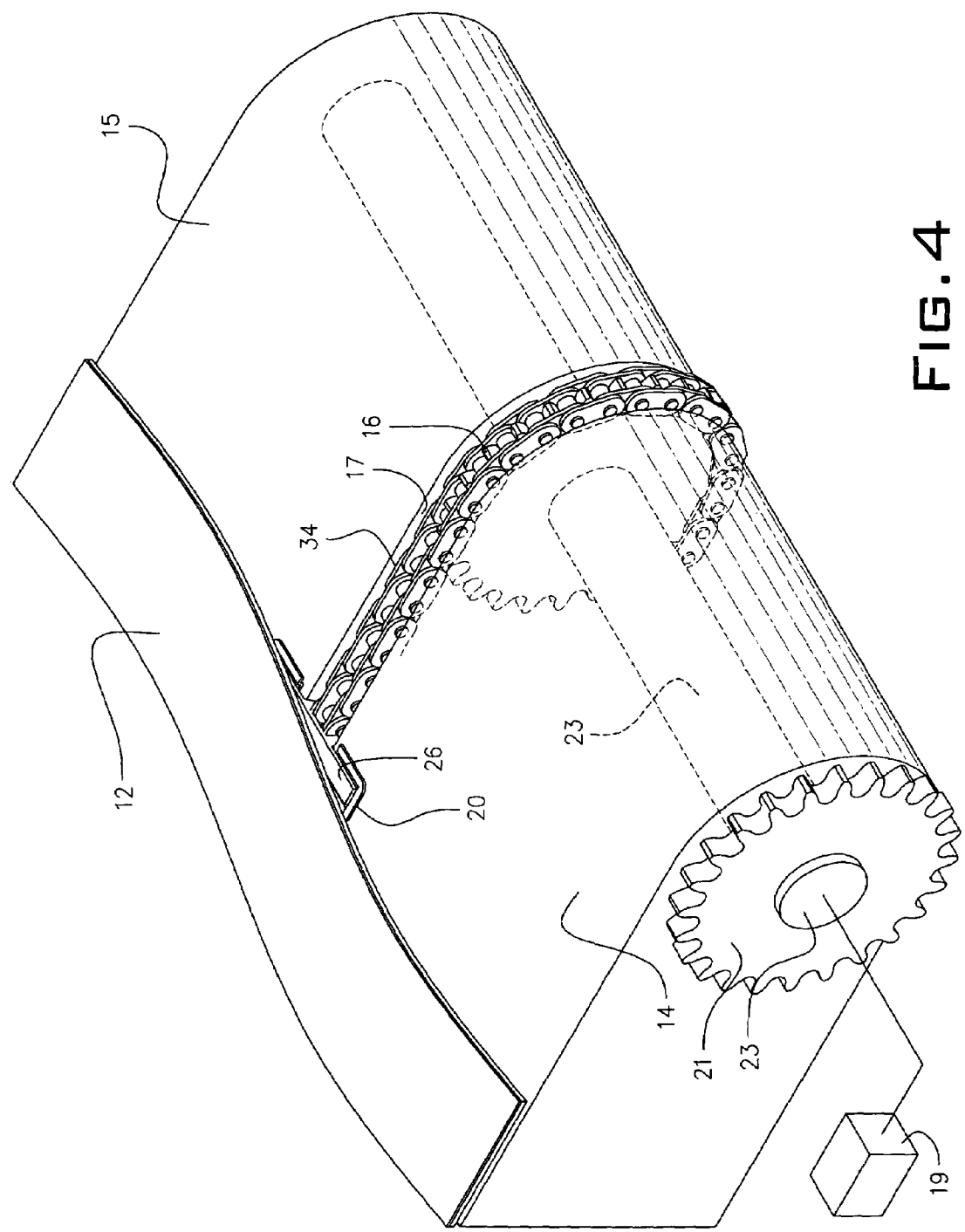
FIG. 4 is a perspective view of an endless conveyor belt slider bed housing with the belt over the slider bed partially cut away.
Figure 5:
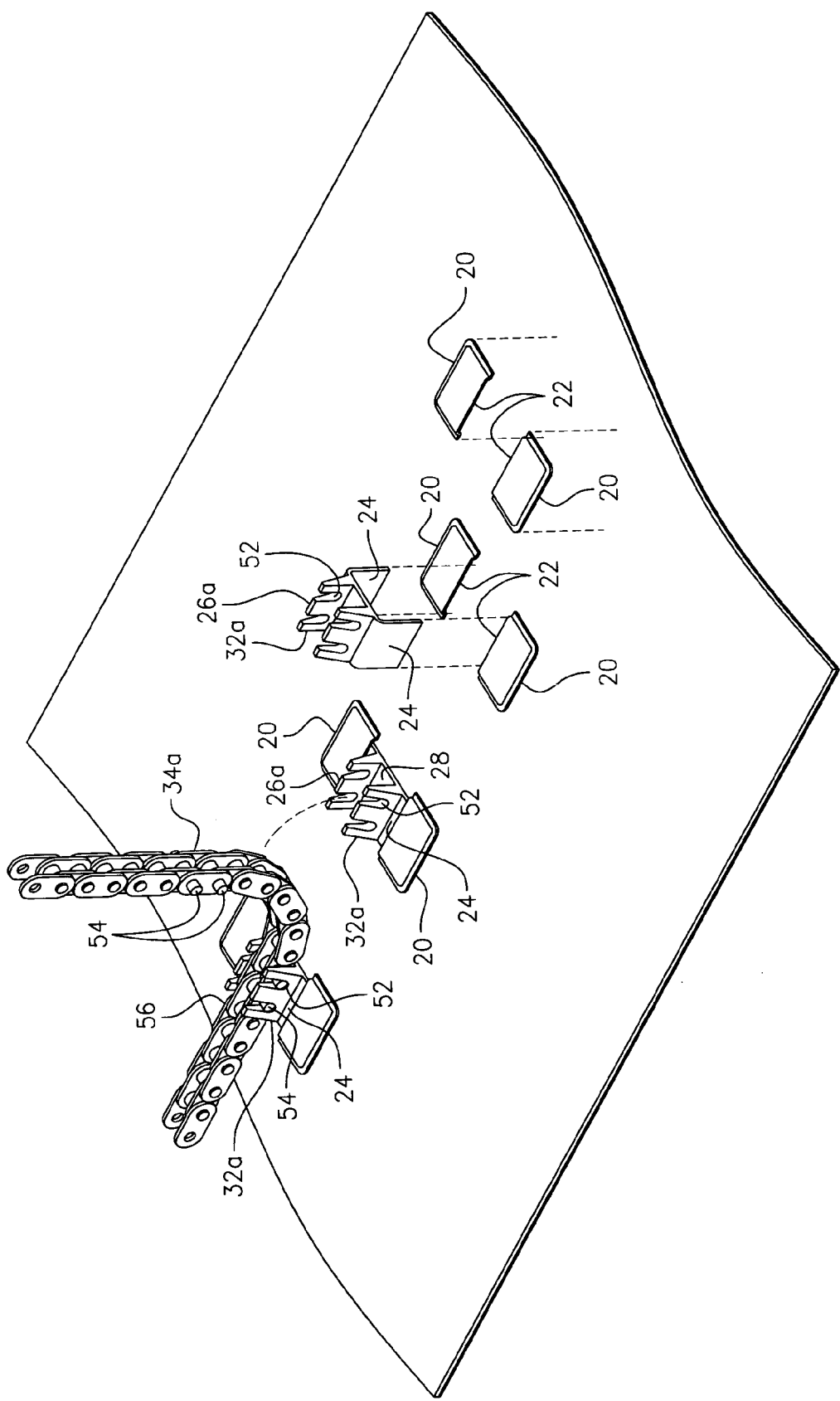
FIG. 5 is an underside view of the belt of this invention used in the conveyor system showing an alternate retaining clip capturing a link of an endless link chain.

Referring to FIGS. 1 and 4, the endless belt conveyor 10 of this invention has a belt 12 usually made from polyvinyl chloride, but could include other belt materials such as cotton well known in the art. Belt 12 moves over a slider bed forming a top surface 15 of a structural housing 14. The belt is moved by motor driven sprockets 16 positioned approximately in the housing's midsection formed as a groove 17 in surface 15. Motor 19, gearing 21 and shaft 23 represent the driving forces which can vary as it is well known in the art. Referring to FIG. 2, the underside 18 of belt 12 has a row of paired oppositely facing pocket pairs 20 permanently attached. The pocket pairs 20 are attached in a row spaced 12–18 inches apart and are made from a high strength polymer or a metal. The pockets 20 are attached to the bottom surface 18 of belt 12 by glue, electrostatic welding, vulcanizing or riveting. An open end 22 of each pocket 20 receives a pliable foot 24 of a retention clip 26. The clip 26 also is made from a high strength polymer or a metal. The foot 24 is slid into the open end 22 of pocket 20 so that a pair of arms 32 on each side of base 28 of clip 26 face downwardly from the bottom surface 18 of belt 12. A pair of flanges 30 face inwardly from the distal end of each arm 32 of the clip 26. A link 33 of a link chain 34 of metal, or a high strength polymer is fed into the clip 26 and held in place by flanges 30. Alternatively, as seen in FIG. 5, the retention clip 26A has slots 52 in the arms 32A to capture a pin 54 in link 56 in link chain 34A.

The motor driven sprockets 16 engage within the openings of link chain 34 or 34A to move belt 12. The clips 26 or 26A are centered in a row on the underside of belt 12. However, if two chains 34 or 34A are desired, there will be two lines of parallel clips offset from the center line. Of course, there would be two lines of drive sprockets 16 in the conveyor housing 14 contiguous with the two link chains 34 or 34A.

The polyvinyl chloride belt 12 can have a cloth backing adhered to the polyvinyl chloride belt for added strength.

Figure 7:
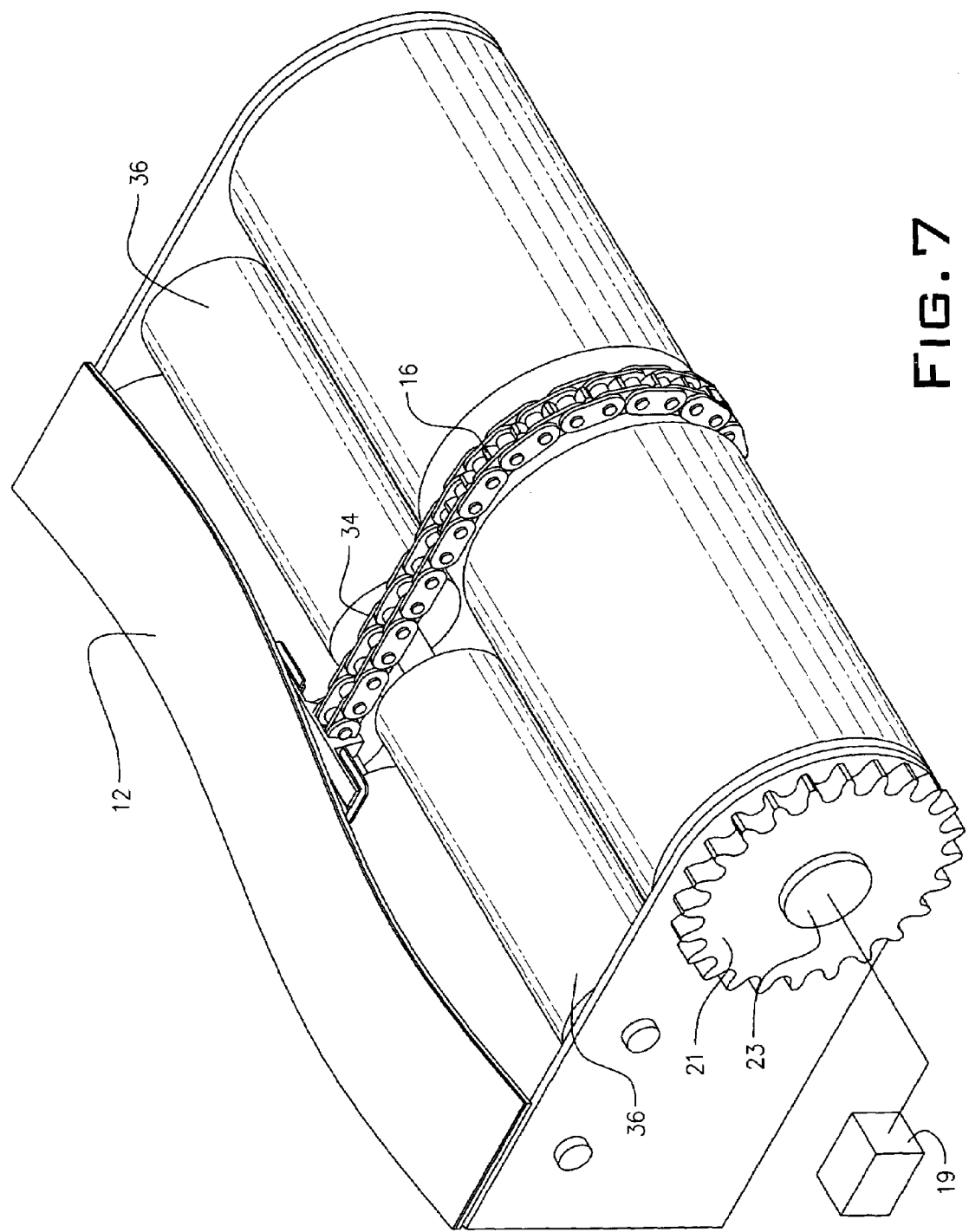
FIG. 7 is a perceptive view of a roller bed housing segments spaced apart to provide a space for a sprocket drive.

The endless conveyor belts are manufactured with different lengths as required by customers. Two or more endless belts can be butted together, raised or lowered with respect to another endless belt as desired for use. The sprockets 16 are driven by a motor 19 in the manner shown in FIGS. 4 and 7 by several gears 23 turning a shaft 21 attached to the sprockets 16.

In an alternate embodiment the top surface 15 of the slider bed can contain instead multiple free moving rollers 36 to decrease friction as the belt 12 moves over the conveyor system. See FIG. 7. In another embodiment the top surface 15 can contain strips of TEFLON® or nylon to facilitate low frictional movement over surface 15.

The sprockets 16 can be made of stainless steel or a heavy duty polymer and the retention clips 26 and 26A are made of a high strength polymer such as nylon or TEFLON® with flexible feet 24.

Figure 6:
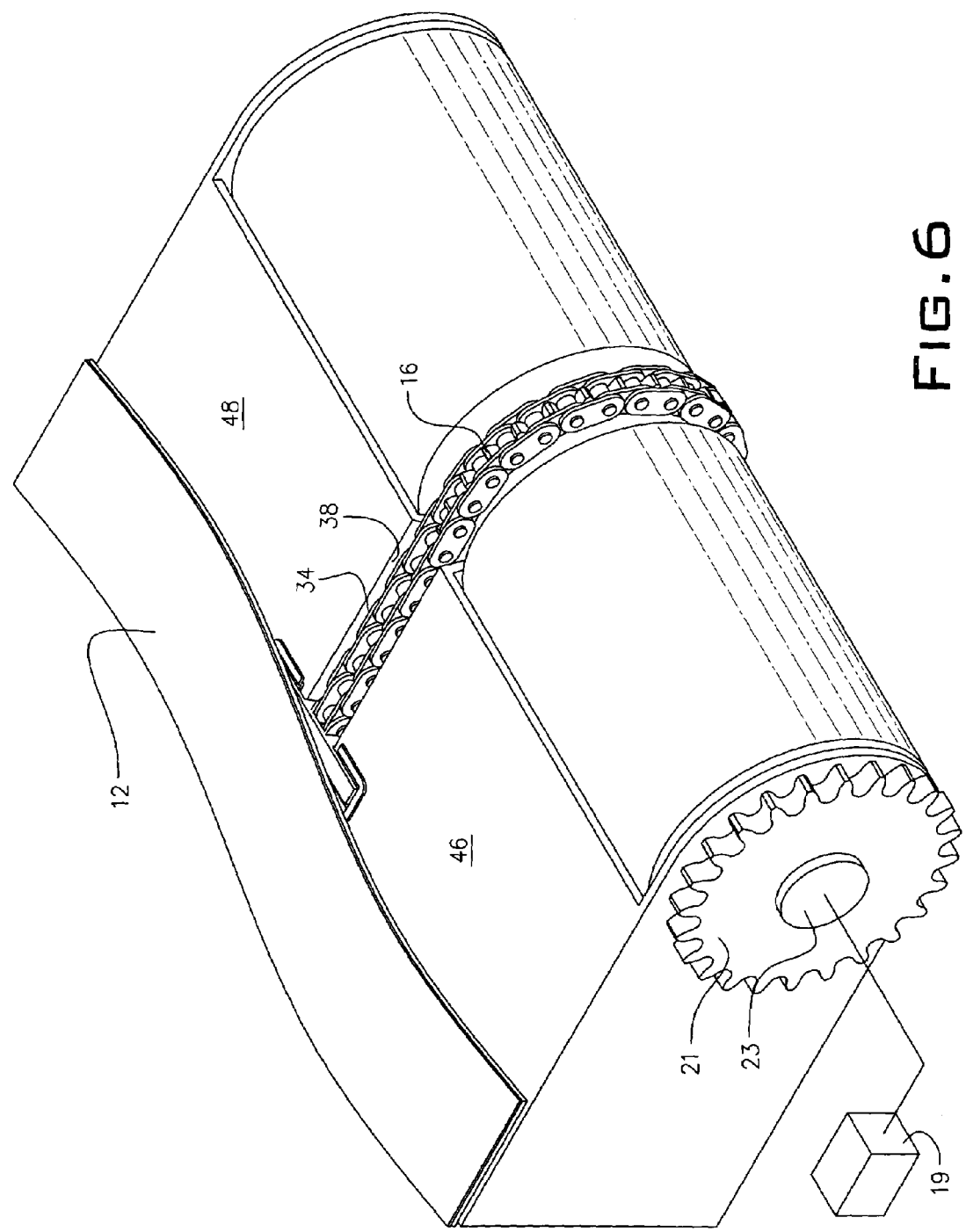
FIG. 6 is a perspective view of an endless conveyor belt slider bed with the slider bed housing in two sections and the belt over the slider bed partially cut away.

The housing 14 can constitute two sections 46 and 48 spaced apart, but tied together with sprockets occupying the space 38 between the housing halves 46 and 48 as shown in FIG. 6.

The endless belt of this invention can carry loads up to several thousand pounds, the weight carrying capacity being generally dependent on the size of the gears, power of the drive motor and size of the sprockets and chain.

Equivalent elements can be substituted for the elements employed in this endless belt conveyor to produce substantially the same results in substantially the same way to achieve substantially the same function.

Having described the invention, what is claimed follows:
1. An endless belt for a conveyor system comprising:
   a top and a bottom surface and a first and second side edge of a longitudinally extending endless belt;
   the top surface adapted to support a load;
   the bottom surface adapted to move over the conveyor system;
   at least one longitudinally configured row of a plurality of spaced apart pairs of pockets attached to the bottom surface of the endless belt, an opening in a first pocket of the pair of pockets opposed to an opening in a second pocket of the pair of pockets, the at least one longitudinal row located inboard between the first and second side edges;
   a retaining clip mounted in each pair of pockets; and
   an endless link chain retained in place on the bottom surface of the endless conveyor belt by the retaining clips, the endless link chain adapted to engage a drive sprocket to drive the endless belt over the conveyor system.

2. The endless belt for the conveyor system according to claim 1 wherein each retaining clip has a pliable foot on a first and second side inserted into the oppositely positioned pair of pockets.

3. The endless belt for the conveyor system according to claim 2 wherein each retaining clip has a pair of spaced apart downwardly extending arms for engaging a link of the endless link chain.

4. The endless belt for the conveyor system according to claim 3 wherein the arms are attached at a proximal end to a roof portion of the retaining clip and at a distal end to an inwardly directed flange for enclosing a link of the endless link chain.

5. The endless belt for the conveyor system according to claim 3 wherein the arms are slotted and are adapted to receive a pin extending from a first and second side of the link to retain the link attached to the retaining clip.

6. The endless belt for the conveyor system according to claim 1 wherein each pair of pockets is vulcanized to the bottom surface.

7. The endless belt for the conveyor system according to claim 1 wherein the pockets are electrostatically welded to the bottom surface.

8. The endless belt for the conveyor system according to claim 1 wherein the pockets are riveted to the bottom surface.

9. The endless belt for the conveyor system according to claim 1 wherein there is one longitudinally configured row of a plurality of spaced apart pairs of pockets located about midway between the first and second side edges.

10. The endless belt for the conveyor system according to claim 9 wherein each pair of pockets is spaced apart from an adjacent pair of pockets in the row a distance of about twelve to eighteen inches.

11. The endless belt for the conveyor system according to claim 1 wherein the belt has an upper surface layer made of polyvinyl chloride.

12. An endless belt conveyor apparatus comprising:
    a housing containing motor driven drive sprockets mounted on a shaft, the sprockets located inboard from a right and left side edge of the housing in a groove in a top surface of the housing;
    an endless belt adapted to move over the top surface of the housing;
    at least one row of a plurality of retaining clips, spaced apart, attached to a bottom surface of the endless belt and positioned over the drive sprockets; and
    an endless link chain retained in place on the bottom surface of the endless conveyor belt by the retaining clips and engaged to the drive sprockets to move the endless belt.

13. The endless belt conveyor system apparatus according to claim 12 wherein the drive sprockets are mounted about equally from the right and left side edge of the housing.

14. The endless belt conveyor apparatus according to claim 12 wherein each retaining clip is mounted to a pair of oppositely positioned pockets permanently attached to a bottom surface of the endless conveyor belt.

15. The endless belt conveyor apparatus according to claim 14 wherein each retaining clip has a pliable foot on a first and second side inserted into the oppositely positioned pockets.

16. The endless belt conveyor apparatus according to claim 15 wherein each retaining clip has a pair of spaced apart downwardly extending arms between the pliable feet and an inwardly directed flange at an end of each arm for enclosing a link of the endless link chain.

17. The endless belt conveyor apparatus according to claim 15 wherein each retaining clip has a pair of spaced apart and slotted downwardly extending arms between the pliable feet, the slotted portion capturing a pin extending outwardly from a first and second side of a link in the endless link chain.

18. An endless belt conveyor system comprising:
    a housing containing a longitudinally mounted drive sprocket inboard about the same distance from a right and left side edge of the housing within a groove in the housing;
    an endless belt adapted to move over a top surface of the housing;
    a row of spaced apart pairs of pockets, an opening in a first pocket of the pair opposed to an opening in a second pocket of the pair, the pockets permanently attached to a bottom surface of the endless conveyor belt about midway between a first and second side edge of the endless conveyor belt;
    a retaining clip mounted in each pair of pockets; and
    an endless link chain retained in place on the bottom surface of the endless conveyor belt by the retaining clips and engaged to the drive sprockets to drive the endless belt conveyor.

19. The endless belt conveyor system according to claim 18 wherein each retaining clip has a pliable foot on a first and second side inserted into the opening in the first pocket and the opening on the second pocket, respectively.

20. The endless belt conveyor system according to claim 19 wherein each retaining clip has a pair of spaced apart downwardly extending arms between the pliable feet and an inwardly directed flange at a top of each arm for enclosing a link of the endless link chain.

21. The endless belt conveyor system according to claim 19 wherein each retaining clip has a pair of slotted downwardly extending arms between the pliable feet, the slotted portion capturing a laterally extending pin on each side of a link of the endless link chain.

22. An endless belt conveyor system comprising:
    a pair of spaced apart housing components attached together to enclose between the housing components longitudinally mounted drive sprockets;
    an endless belt adapted to move over a top surface of the pair of housing components;
    a row of spaced apart pairs of pockets, an opening in a first pocket of the pair opposed to an opening in a second pocket of the pair, the pockets permanently attached to a bottom surface of the endless belt about midway between a first and second side edge of the endless conveyor belt;

a retaining clip mounted in each pair of pockets; and an endless link chain retained in place on the bottom surface of the endless conveyor belt by the retaining clips and engaged to the drive sprockets to drive the endless belt conveyor.

23. The endless belt conveyor system according to claim 22 wherein each pair of pockets is spaced apart from an adjacent pair of pockets in the row a distance of about twelve to eighteen inches.

24. The endless belt conveyor system according to claim 22 wherein the retaining clip has a pair of flexible legs mounted within the pair of pockets and a pair of downwardly depending arms from a proximal end adjacent the flexible legs to a distal end terminating in an inwardly directed flange to capture a link of the endless link chain.

25. The endless belt conveyor system according to claim 22 wherein the retaining clip has a pair of slotted downwardly depending arms, the slotted portion engaging a pin extending from each side of a link of the endless link chain.

* * * * *